United States Patent [19]

Nomoto et al.

[11] Patent Number: 5,751,247
[45] Date of Patent: May 12, 1998

[54] FIXED EARTH STATION

[75] Inventors: Shinichi Nomoto, Tokyo; Hideo Kobayashi, Saitama; Teruhiko Honda; Kazuo Hara, both of Tokyo, all of Japan

[73] Assignee: Kokusai Denshin Denwa Kabushiki Kaisha, Tokyo, Japan

[21] Appl. No.: 797,860

[22] Filed: Feb. 10, 1997

[30] Foreign Application Priority Data

Mar. 7, 1996 [JP] Japan .................................. 8-078170

[51] Int. Cl.$^6$ ...................................................... H01Q 3/00
[52] U.S. Cl. ............................................................ 342/359
[58] Field of Search ........................... 342/359; 343/882, 343/880, 766

[56] References Cited

U.S. PATENT DOCUMENTS

| | | | |
|---|---|---|---|
| 3,893,123 | 7/1975 | Bieser | 343/706 |
| 4,837,576 | 6/1989 | Schwarz | 342/77 |
| 5,241,319 | 8/1993 | Shimizu | 342/358 |
| 5,245,348 | 9/1993 | Nishikawa et al. | 342/359 |
| 5,347,286 | 9/1994 | Babitch | 342/359 |

*Primary Examiner*—Theodore M. Blum
*Attorney, Agent, or Firm*—Westman, Champlin & Kelly, P.A.

[57] ABSTRACT

It is the object of the present invention to provide a fixed earth station in which many antennas can be placed in a site area limited to one-several tenth of the conventional one.

On a rotatable base 2, a plurality of antennas 1a to 1e are mounted. A control unit 4 controls the rotation angle of a drive unit for driving the base by the previously known orbital parameters of communication satellites. Further, the azimuth angle and the elevation angle of the respective antennas are controlled by antenna control units 5a to 5e, and the antennas catch and track communication satellites having appeared in the sky. As a result, the rotation angle of the base 2 can be set so that a beam accessing a satellite of a low elevation angle is not intercepted by other antennas. In addition, the area in which the antennas are placed can be reduced to about 1/50 of the conventional one. As other embodiments, there are an embodiment in which the antenna height is varied, an embodiment in which antennas are mounted on vehicles to change the position thereof, an embodiment in which antennas are made to travel on previously laid rails, etc.

15 Claims, 16 Drawing Sheets

F I G. 15A
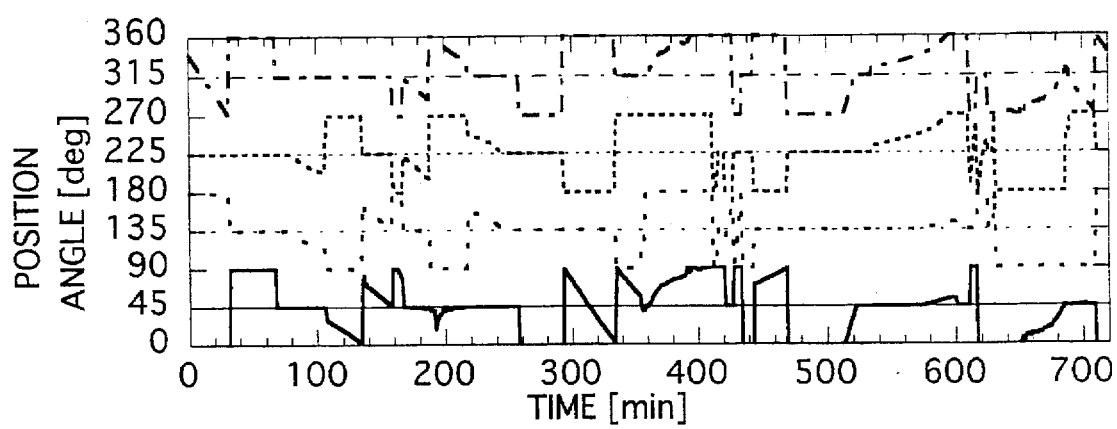
F I G. 15B
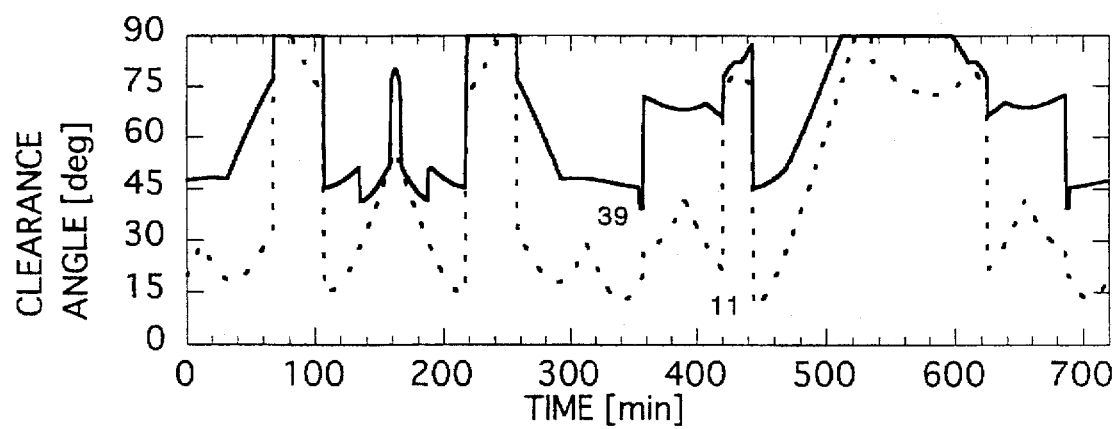

FIXED EARTH STATION

BACKGROUND OF THE INVENTION

1. Field of the Invention

The present invention is related to a fixed earth station, and particularly to a fixed earth station which can be used for various satellite communications and enable the installation area of antennas to be reduced.

2. Description of the Related Art

A satellite communications system which constructs a wide-area network using communication satellites generally includes at least one fixed earth station accessing the communication satellites in the system as a central control station (hub station), regardless of whether or not its user has an earth station (user station) for directly accessing satellites. Further, to connect a satellite network to another communication network (ground system or another satellite system), fixed earth stations as gateway stations are often placed at a location geographically advantageous for the network connection. Since a large transmission capacity and high reliability are required in the facility of these fixed earth stations, one or more antennas are absolutely necessary for forming a link with satellites existing in the visible range from the location. In the satellite-fixed earth station link (feeder link) which is the main link of a network, the antenna needed for that has a relatively large aperture (5 to 10 m or larger in diameter).

Furthermore, not only in a non-geostationary satellite system, but also even in a system using geostationary satellites, a beam stearing (satellite tracking) equipment for accurately directing a thin beam to the direction of a satellite is required to meet the control of the satellite in a transfer orbit or the change in orbit position. Accordingly, the antenna facility required in a hub station or a gateway station is generally of a large scale, and thus it has been fixedly placed and operated on the ground. For this, in a fixed earth station simultaneously accessing a plurality of different satellites in the visible range, a plurality of independent antennas needed to be spaced apart from each other by a distance which prevents the occurrence of physical and electrical interferences. Since the beam to be directed to a satellite must keep a sufficient electrical clearance between the facility of other antennas, it is required that the distance between antennas should be made specifically large if the elevation angle of a satellite is small, which results in the need for a wide land (site).

For instance, as shown in FIG. 20, in a simple model in which, in the direction of the azimuth angel of the beam 202 from an antenna 201a, there is another antenna 201b, the required minimum distance Smin between the antennas is Smin=Dcos (ELmin) cot (ELmin-α)+Dsin (ELmin) on the assumption that the antenna aperture diameter is D, the minimum operational elevation angle is ELmin, and the marginal angle from physical clearance for electrical clearance is α. For instance, if D=10 (m), ELmin=5° and α=2°, then Smin=191 (m), the antennas need to be spaced apart by a distance about 20 times the antenna diameter.

Demands for accessing a plurality of satellites are now increasing as satellite communication networks are developed and diversified, but such conditions will be a large hindrance to the acquisition of a site for the installation of an earth station. The reuse of the sites of existing earth stations may be difficult depending on the development pattern of a system. Further, to previously acquire a wide site area foreseeing not only the development of the system but also the future prediction including variables such as the construction of other potential satellite system for interconnection is not only undesirable in the viewpoint of the effective use of land, but also limits the candidates for installation site and forces other factors (such as isolation from ground communication networks or areas having many demands) to be sacrificed.

As one of the prior arts for solving such problems, there is a method using a multibeam antenna. Since the multibeam antenna is an antenna which allows one antenna aperture to be physically shared to emit a plurality of beams, it is very effective in utilizing the site for an earth station.

Multibeam antennas applicable to earth station antennas are roughly grouped into a reflecting mirror antenna and a phased array antenna. The former excites one (or a small number of) fixed reflecting mirror with a plurality of primary radiators to generate a plurality of beams, and can provide a high-performance multibeam antenna with a relatively simple construction. However, since it cannot scan a beam over a wide angle, it is limited, for instance, to the applications such as accessing a plurality of adjacently located satellites on a geostationary satellite orbit, and it substantially cannot apply to a system using a non-geostationary satellite for which the tracking system needs to operate over the whole field of view from the earth station.

In contrast to this, the array antenna is an attractive means in principle, which requires no mechanical drive unit, and can freely form a plurality of beams in independent directions by electrically controlling the phase of the radio waves from a plurality of elements. However, to compensate the loss inherent in the variable phase shifter, it is needed to prepare an amplifier for each one element. Further, the phase shifter which performs accurate phase control for a wide frequency band width is extremely expensive. In addition, to scan a beam over a wide angle, array elements need to be placed at intervals not longer than the wavelength, and for the hub or gateway station which requires 100 λ (λ: wavelength) or greater as the electrical aperture, the number of elements becomes so large that the array antenna is still unpractical.

Moreover, there may be a disadvantage that, if these multibeam antennas are used, and an equipment component commonly used for a plurality of beams fails or it is needed to stop its operation, then effect will ripple through the all beams.

As described above, the conventional fixed earth station as shown in FIG. 20 had a problem that it was difficult to flexibly deal with the addition of antennas associated with the development of satellite communication systems, and the preparation of a wide site was necessary in a system requiring many antennas. Further, the methods using the multibeam antenna, an object of which was to solve the above problems, include the method using a reflecting mirror antenna and the method using a phased array antenna, but the former had a problem that it substantially could not apply to a system using a non-geostationary satellite for which the tracking system needs to operate over the whole filed of view from the earth station, because it could not scan a beam over a wide angle, while the latter had a problem that it was still unpractical, because the variable phase shifter accurately controlling the phase for a wide frequency band width was expensive or the number of elements became very large.

SUMMARY OF THE INVENTION

An object of the present invention, which was made in view of the above described problem of the prior art, is to provide a fixed earth station which can be placed in a limited site area as an earth station comprising many antennas. Further, another object is to provide a fixed earth station which can be placed in a limited site area, and is free from the above problems with the reflecting mirror and phased array antennas as multibeam antennas. Furthermore, another object is to provide a fixed earth station which is highly flexible and reliable in operation.

To accomplish the above objects, the present invention is a fixed earth station having a plurality of antennas the beam direction of which can be independently changed to allow simultaneous communication with a plurality of communication satellites existing in different directions within the visible range, characterized by comprising a mobile mechanism for mounting part or all of the plurality of antennas, a control unit for generating a signal for controlling the operation of the mobile mechanism, on the basis of the orbital parameters of the plurality of communication satellites, so that a beam accessing a satellite of a low elevation angle is not intercepted by other antennas, and antenna control units for controlling the direction of the antennas based on at least the orbital parameters of the communication satellites.

In accordance with the present invention, since antennas are mounted on the mobile mechanism which is controlled based on the orbital parameters of a plurality of communication satellites, the relative placement positions of the antennas can be changed according to the movement of the communication satellites so that a beam accessing a satellite of a low elevation angle is not intercepted by other antennas. Accordingly, the placement area of the plurality of antennas of the fixed earth station can be reduced to one-several tenth as compared with that of the prior art.

BRIEF DESCRIPTION OF THE DRAWING

FIGS. 15A and 15B are a diagram in which the positions of the four antennas in the seventh embodiment are represented as change of the angle measured clockwise from the north with respect to the center of the loop, and a diagram showing the minimum clearance achieved by this embodiment.

DETAILED DESCRIPTION OF THE PREFERRED EMBODIMENT

Figure 1:
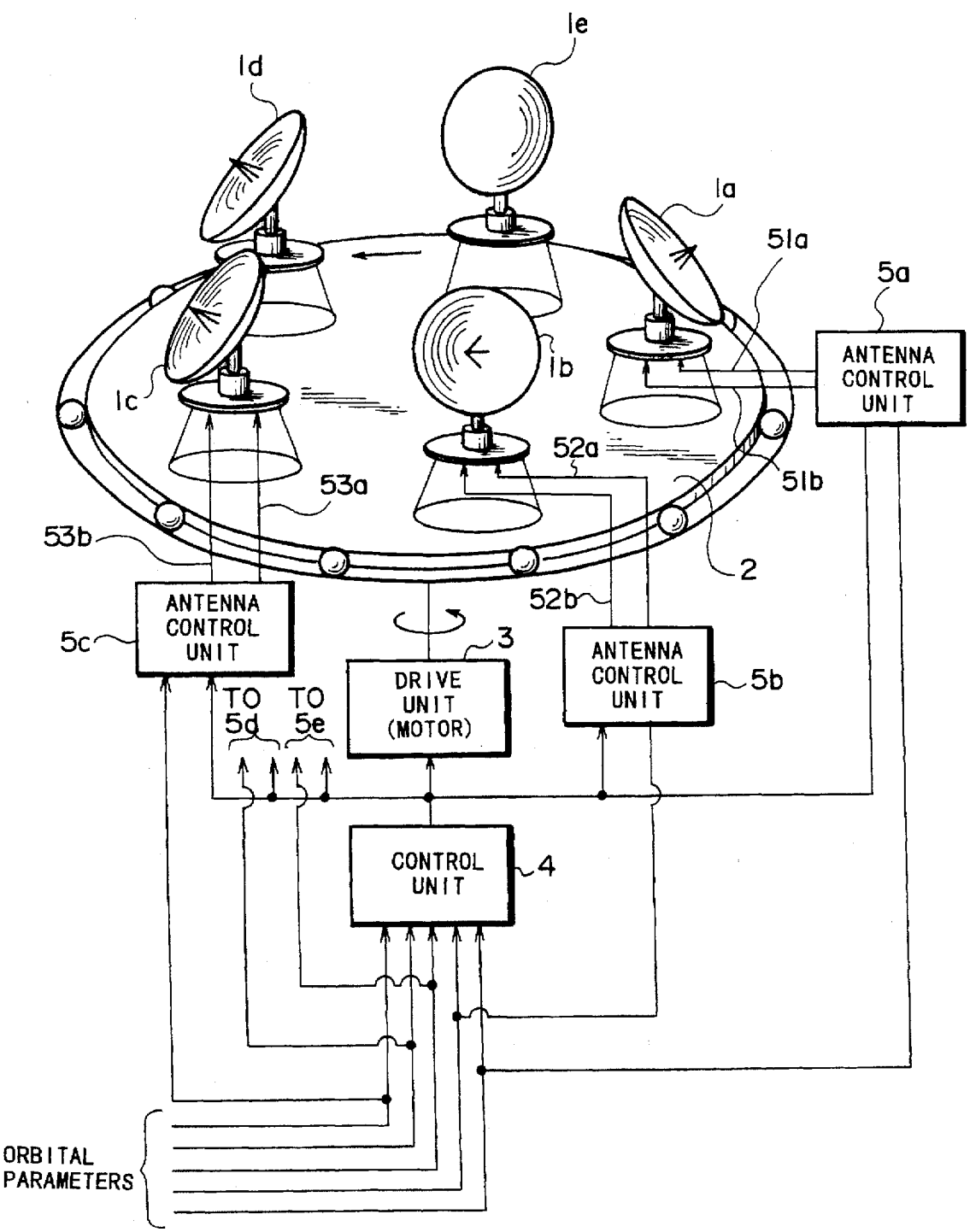
FIG. 1 is a block diagram of the first embodiment of the present invention.

Now, the present invention is described in detail with reference to the drawing. FIG. 1 is a figure showing the construction of one embodiment of the present invention, and it shows a fixed earth station having a plurality of (five) antennas $1a$ to $1e$. The antennas $1a$ to $1e$ are mounted on a common base 2, and placed at the vertexes of a regular pentagon. The base 2 is rotated by a drive unit (motor) 3. As the base 2 rotates, the position of each antenna changes accordingly. To a control unit 4, the orbital parameters of satellites moving across the sky are inputted. The control unit 4 generates a signal for controlling the operation of the drive unit 3 on the basis of the orbital parameters. Each of antenna control units $5a$ to $5e$ ($5d$ and $5e$ are not shown) generates and outputs a signal for controlling the azimuth angle and the elevation angle of each antenna $1a$ to $1e$. By controlling the drive unit 3 of the base 2 by the control unit 4, and controlling the azimuth angle and the elevation angle of each antenna $1a$ to $1e$ by the antenna control units $5a$ to $5e$, the rotation angle of the base 2 can be set so that a beam accessing a satellite of a low angle is not intercepted by other antennas.

Figure 2:
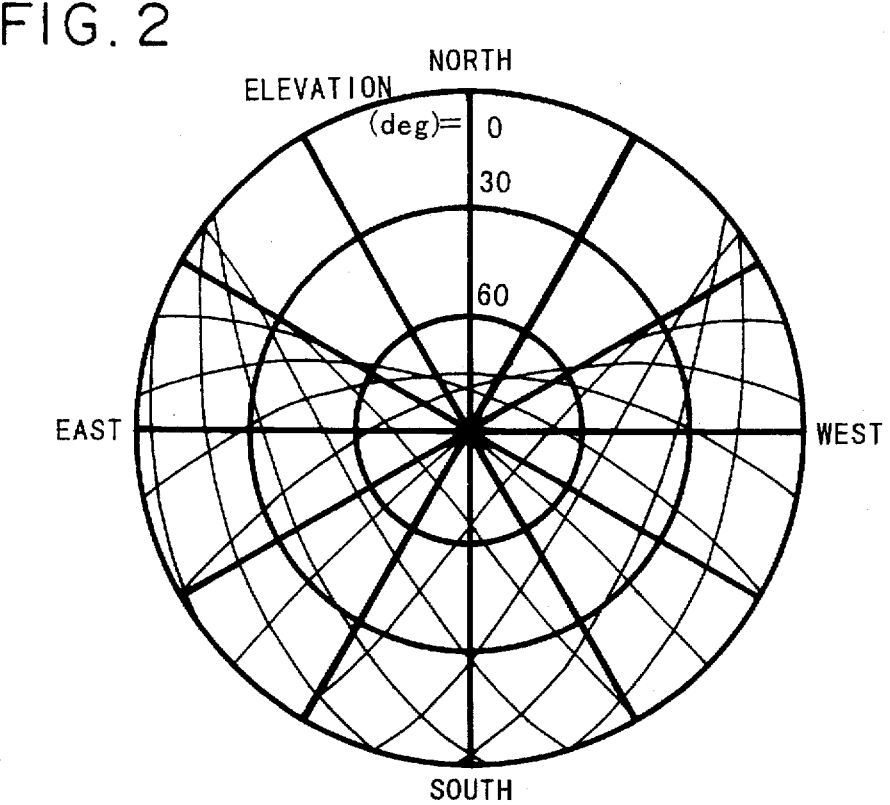
FIG. 2 is a diagram showing the locusci of ten medium-altitude earth orbiting satellites moving across the sky.

Taking, by way of example, a non-geostationary satellite system in which a total of ten communication satellites are placed, and each five satellites are placed at regular intervals on two medium-altitude satellite orbits orthogonal to each other at a height of about 10400 km from the earth surface and with an inclination angle of the orbit plane of 45 degrees, the movements of the communication satellites observed near Japan are shown as locusci in the sky as in FIG. 2.

Figure 3A:
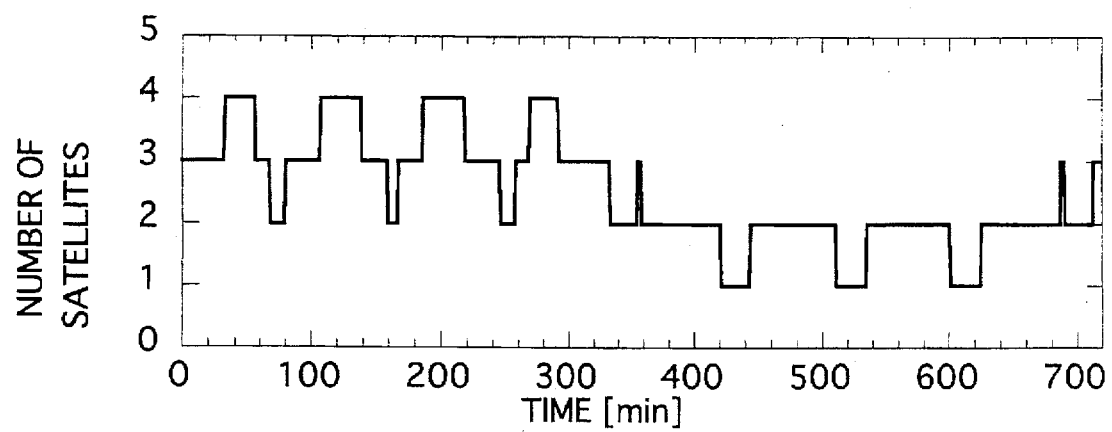
FIGS. 3A to 3C are diagrams showing the number of satellites having an elevation angle of 5 degrees or greater among the ten satellites, and the azimuth angle and the elevation angle of the direction in which each antenna points if those satellites are sequentially assigned to five antennas.
Figure 3B:
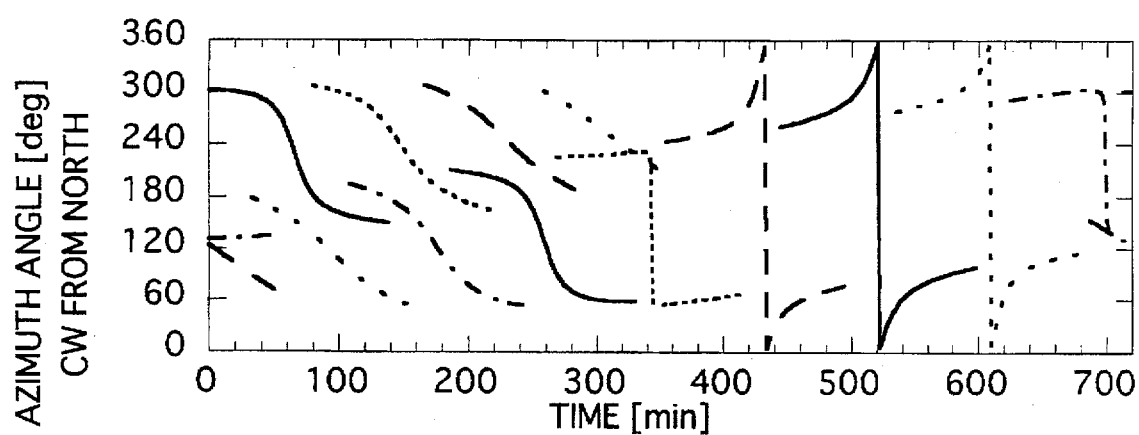
Figure 3C:
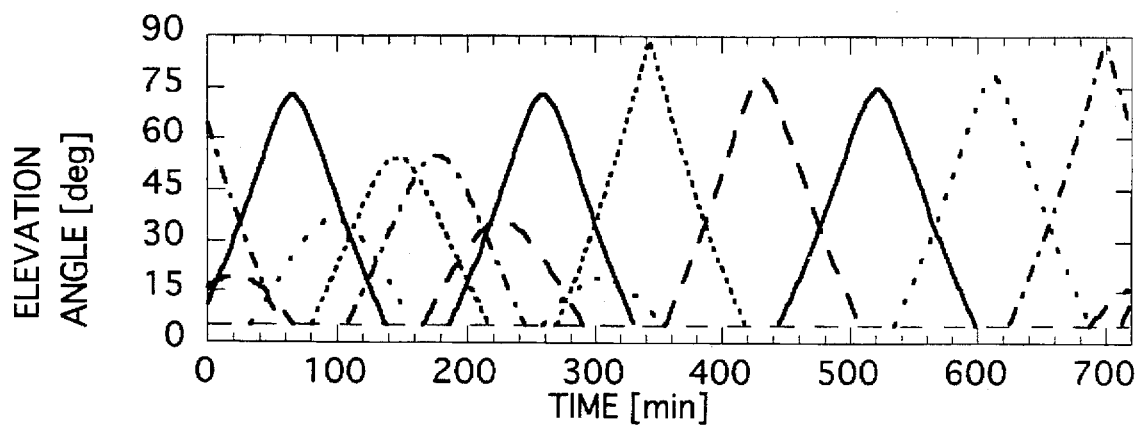

FIGS. 3A, 3B and 3C show the number of satellites having an elevation angle of 5 degrees or larger among the ten satellites, and the azimuth angle and the elevation angle of them. In this orbit example, the movements of the satellites have a period of 12 hours (720 minutes). In FIGS. 3B and 3C, the satellites having an elevation angle of 5 degrees or larger are sequentially assigned to the five antennas, and a1 to a5 in the same FIG. 3B are corresponding to the respective azimuth angles of the directions in which the five antennas are pointing, while e1 to e5 in the same FIG. 3C are corresponding to the respective elevation angles of the directions in which the above five antennas are pointing. In this way, the radiation angle information of a beam for the satellites at each time can be obtained for each satellite if the orbital parameters of the satellites are previously known.

Figure 4A:
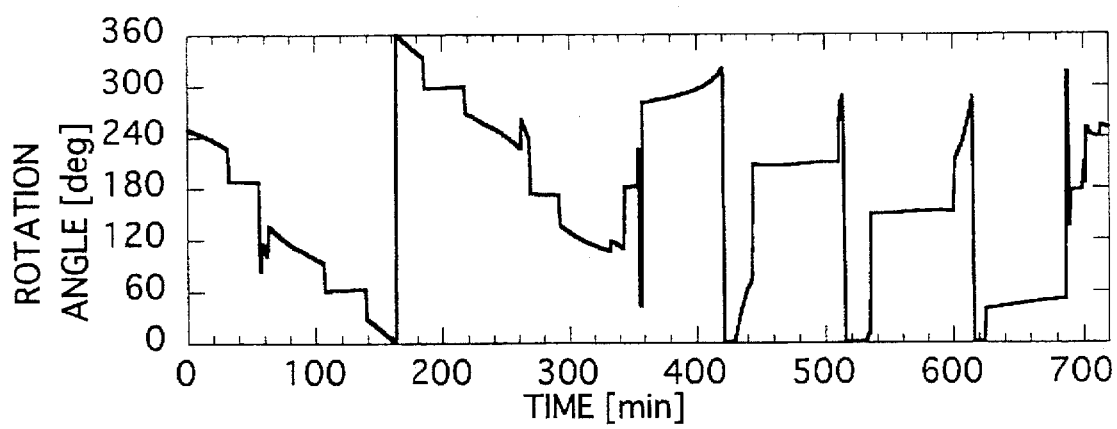
FIGS. 4A and 4B are diagrams showing the control angle of the rotation of the base of the first embodiment, and the minimum clearance achieved by this embodiment.

Thus, to the control unit 4 in FIG. 1, the orbital parameters of the azimuth angle and the elevation angle of FIGS. 3B and 3C are applied. Further, to the respective antenna control units 5a to 5e, the respective orbital parameters of the five satellites having an elevation angle of 5 degrees or larger are applied. The control unit 4 creates the control information on the rotation angle of the base 2 as shown in FIG. 4A from the orbital parameters, and provides it to the drive unit 3. As a result, the base 2 performs a rotation according to the locus of FIG. 4A. On the other hand, each of the antenna control units 5a to 5e generates control information on azimuth angle and elevation angle for pointing the antenna to the direction of a satellite to be tracked, from control information on the rotating angle of base 2 from the control unit 4 and the orbital parameters of the respective satellites, and provides it to each antenna. 51a, 52a, 53a, . . . in FIG. 1 represent azimuth angle control signals, and 51b, 52b, 53b, . . . represent elevation angle control signals. In addition, as the algorithm for obtaining the rotation angle of the base 2 of FIG. 4A, the conventional optimization method can be applied.

Figure 4B:
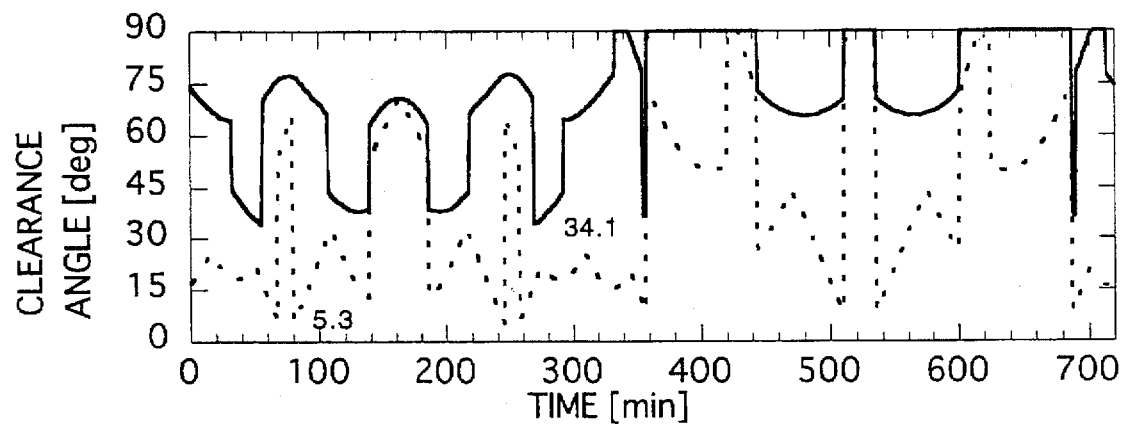

The rotation angle of FIG. 4A shows the result of a calculation in which the rotation angle of the base 2 was optimized so as to maximize the minimum value of the angle which the beam radiated from each antenna forms with the direction of another antenna (hereinafter referred to as minimum clearance angle). FIG. 4B shows the minimum clearance angle by this embodiment, and the minimum clearance angle obtained when the antenna is not moved to fix the rotation angle, as shown by a dotted line, for exhibiting the effect of this embodiment. In the case in which the rotation angle is fixed, the lowest value of the minimum clearance angle is 5.3 degrees, which is nearly equal to the minimum elevation angle of 5 degrees.

On the other hand, in this embodiment, the value is 34.1 degrees. That is, in accordance with this embodiment, the required antenna spacing is effectively reduced from Smin for ELmin=5.3 degrees to Smin for ELmin=34.1, and it is considered that the effect is substantially tan (ELmin), and thus the length can be reduced to about ⅛ and the area can be reduced to about 1/50.

Figure 5:
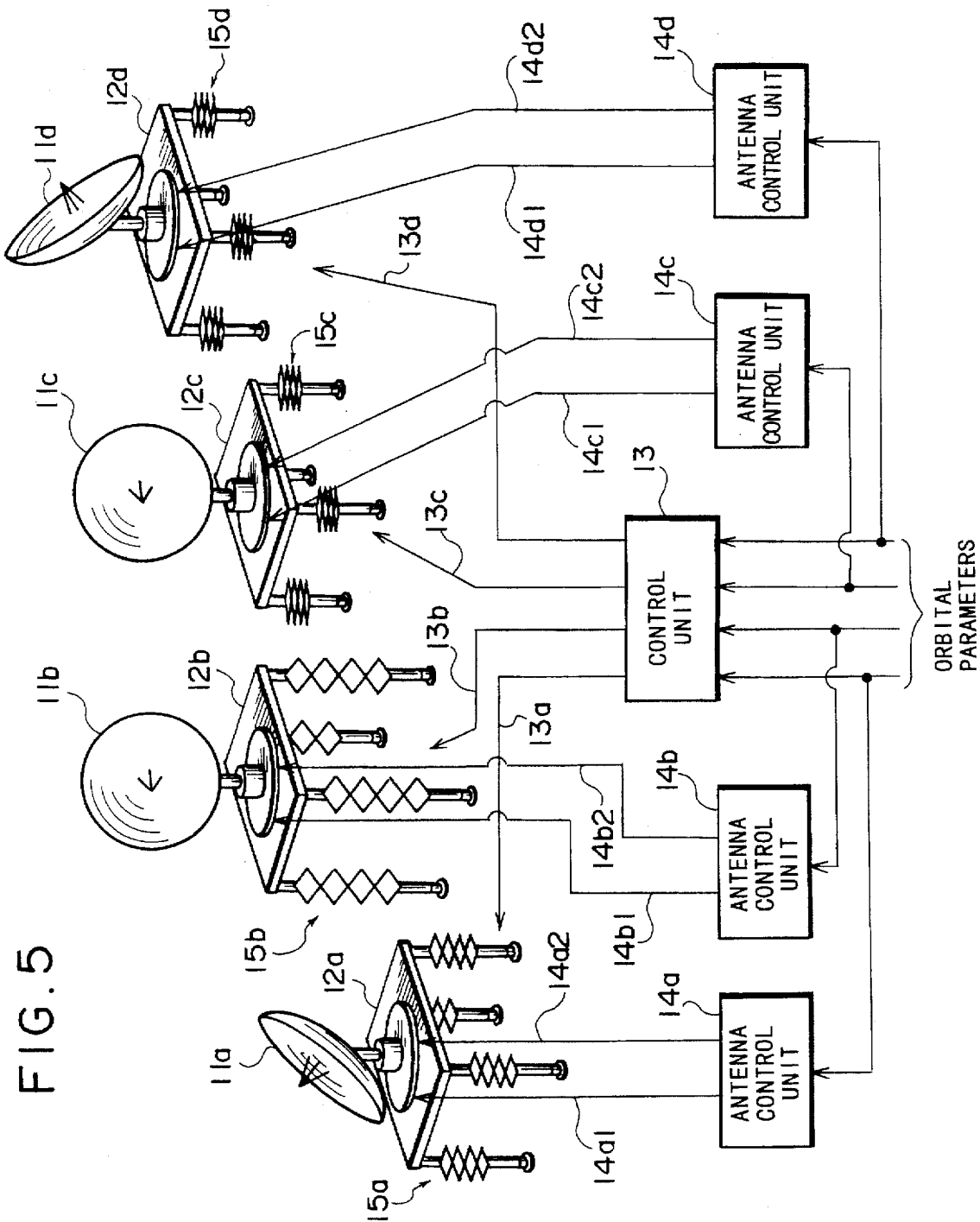
FIG. 5 is a block diagram of the second embodiment of the present invention.

The second embodiment of the present invention is now described with reference to FIG. 5. FIG. 5 shows a fixed earth station having four antennas 11a to 11d. The antennas 11a to 11d are mounted on bases 12a to 12d which independently vary in the vertical direction. Base drive units 15a to 15d for achieving a displacement in the vertical direction can be implemented by a conventional mechanism, for instance, screw jack, pump or the like, and as the power source, electricity, hydraulic pressure, air pressure or the like can be used. The control unit 13 is supplied with the orbital parameters of each satellite which are in a form same or similar to the first embodiment, and the control unit 13 generates and outputs signals for controlling the base drive units 15a to 15d from the orbital parameters. The base drive units 15a to 15d move up and down according to the control signals.

To each of antenna control units 14a to 14d, the orbital parameters of each satellite are inputted. The antenna control units 14a to 14d generate signals 14a1, 14a2, . . . , 14d1, and 14d2 for controlling the azimuth angle and the elevation angle of the corresponding antennas, and output them to the corresponding antennas.

Figure 6A:
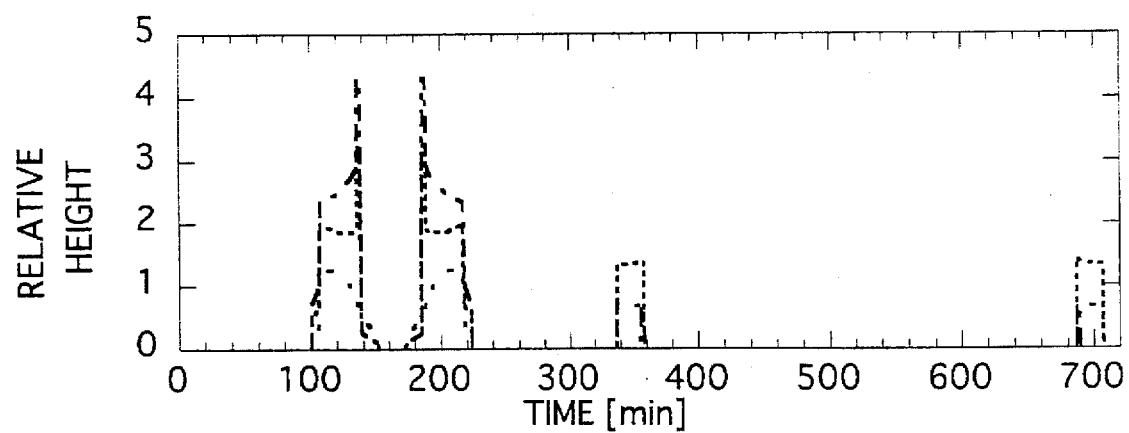
FIGS. 6A and 6B are diagrams showing the relative height of the base of the second embodiment, and the minimum clearance achieved by this embodiment.
Figure 7A:
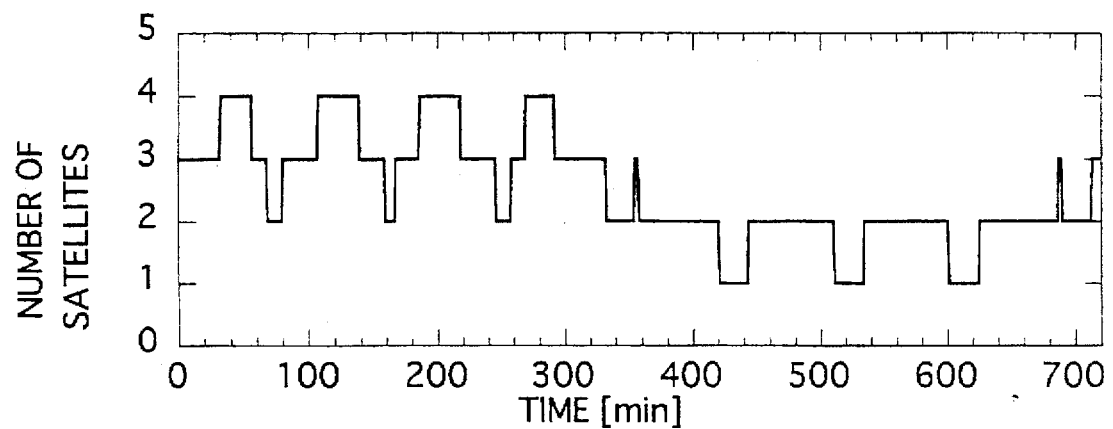
FIGS. 7A to 7C are diagrams showing the number of satellites having an elevation angle of 5 degrees or greater among the ten satellites, and the azimuth angle and the elevation angle of the direction in which each antenna points if these satellites are sequentially assigned a to four antennas.
Figure 7B:
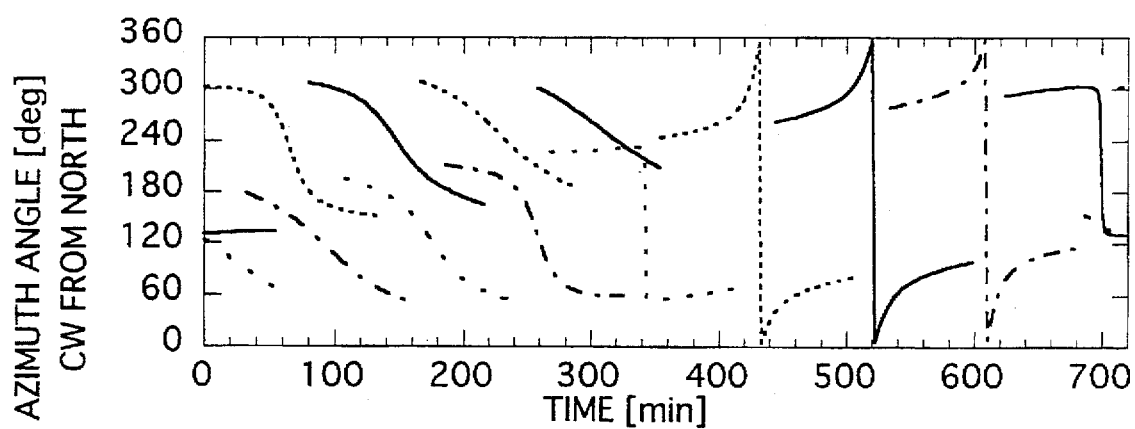
Figure 7C:
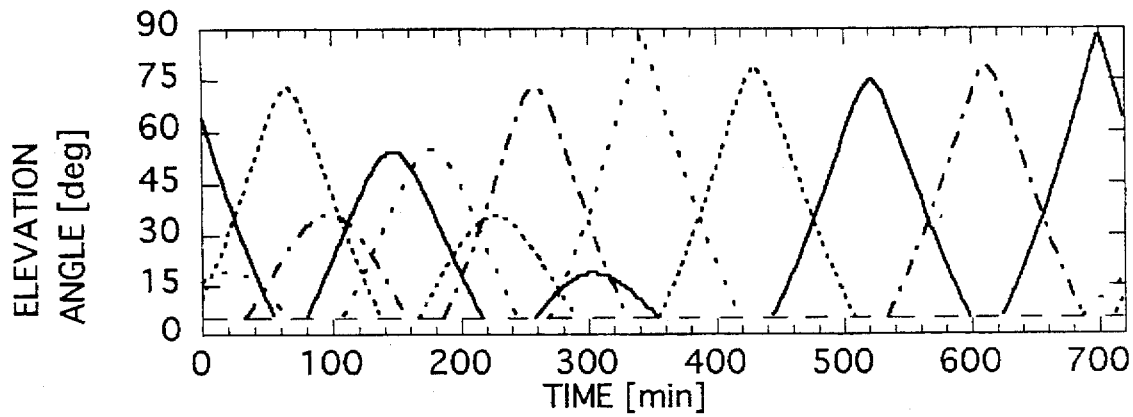

FIG. 6A shows the output signals of the control unit 13 when the heights of the bases 12a to 12d were optimized to maximize the minimum clearance angle of 45 degrees or smaller. Further, FIGS. 7B and 7C represent the azimuth angle and elevation angle control signals for the respective four antennas which are outputted from the antenna control units 14a to 14d, respectively. By controlling the heights of the bases 12a to 12d, and controlling the azimuth angle and the elevation angle of each antenna in this way, the beam accessing a satellite of a low elevation angle can be prevented from being intercepted by other antennas.

Figure 6B:
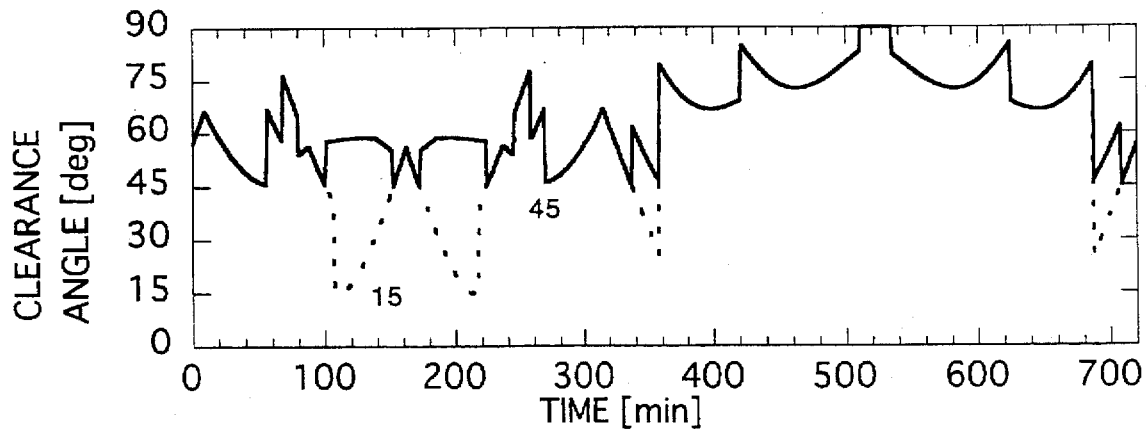

FIG. 6B shows the minimum clearance angle (solid line) of the antenna which is obtained by this embodiment, and the minimum clearance angle (dotted line) which is obtained if the height is fixed and the antenna is not moved. The smallest value of the minimum clearance angle is 15 degrees if the height is fixed, whereas it is 45 degrees in this embodiment. That is, by this embodiment, the required antenna spacing can effectively be reduced from Smin for ELmin=15 degrees to Smin for ELmin=45 degrees. And, since it is considered that the effect is nearly the ratio of tan (ELmin), the length can be reduced to about ¼ and the area can be reduced to about 1/14.

Figure 8:
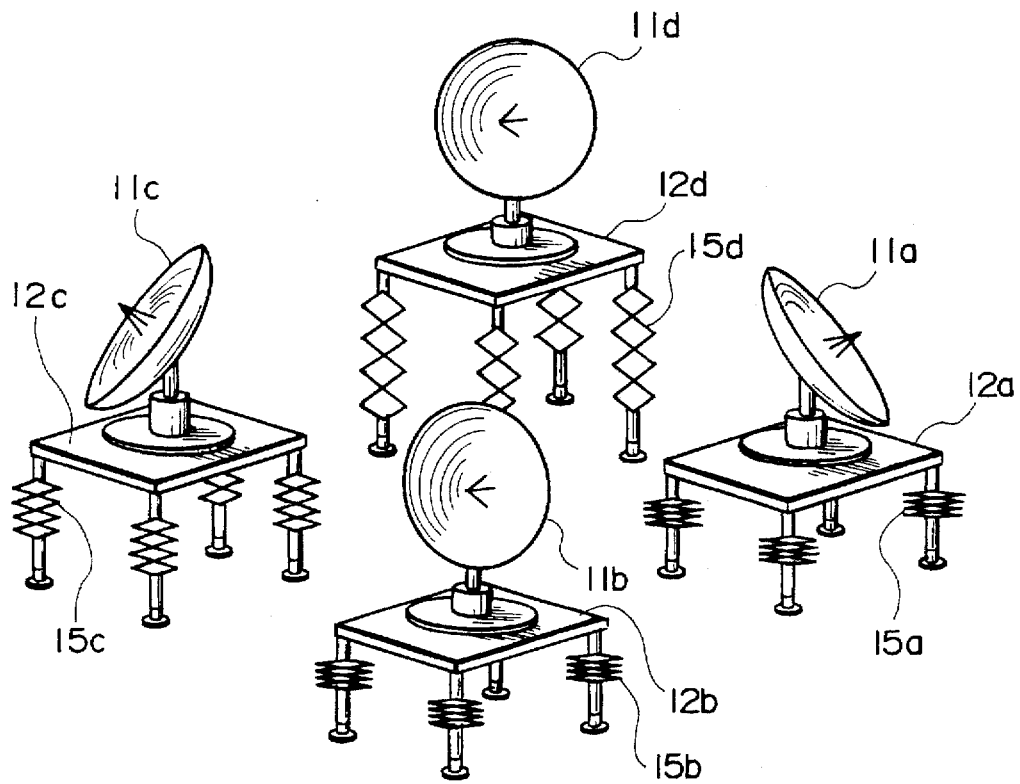
FIG. 8 is a schematic view of the third embodiment of the present invention.

In addition, although, in FIG. 5, four antennas are linearly placed in the north and south direction by way of example, this embodiment may be applied to a construction in which they are distributing on a plane as in FIG. 8. Further, this embodiment is not limited to four antennas, but can also be applied to five antennas.

Figure 9:
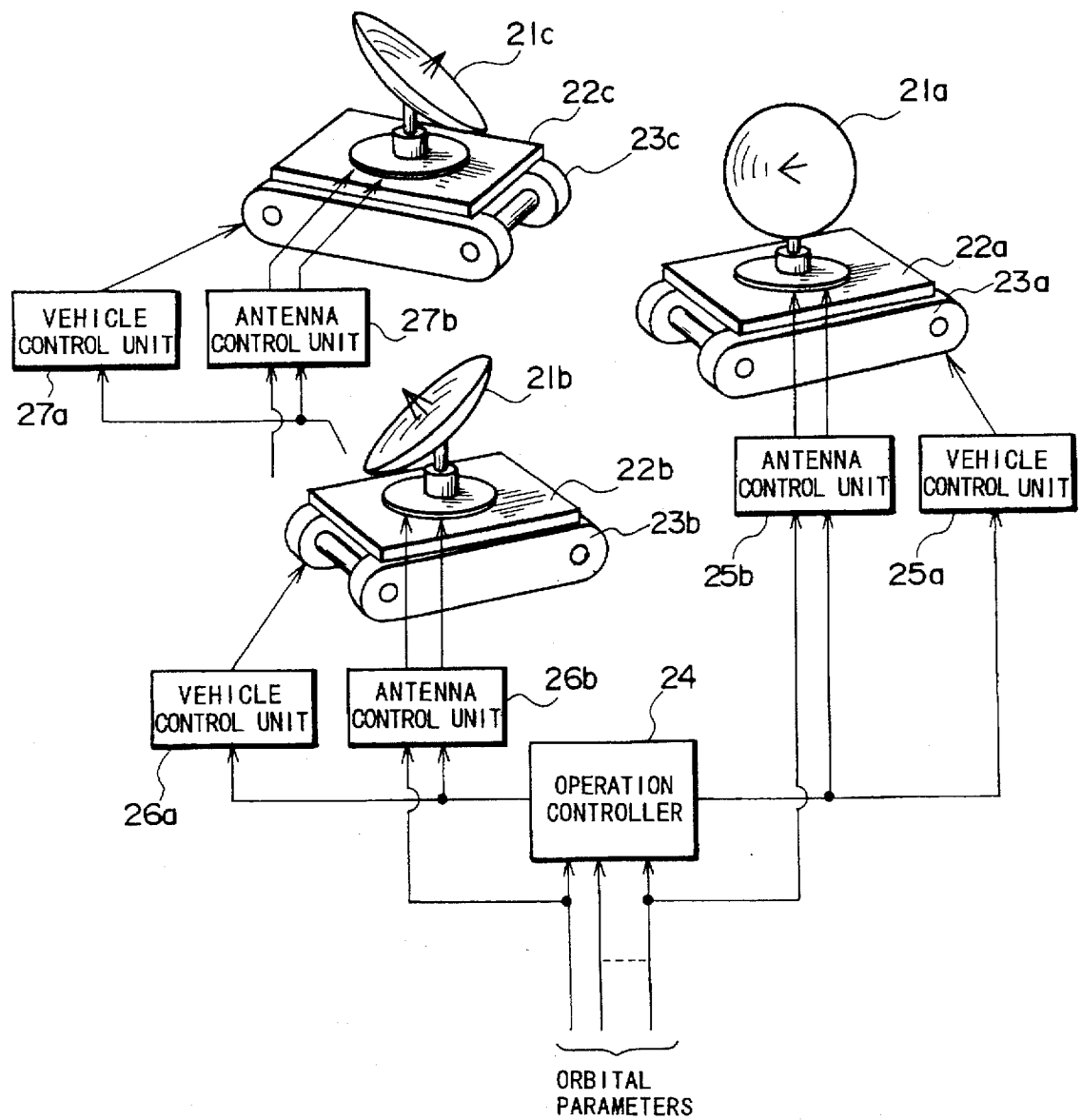
FIG. 9 is a block diagram of the fourth embodiment of the present invention.

The third embodiment of the present invention is described below with reference to FIG. 9. This embodiment shows a fixed earth station having three antennas 21a to 21c. The antennas 21a to 21c are mounted on vehicles 23a to 23c which can independently travel on the ground along with the bases 22a to 22c for the antennas. To an operation controller 24, orbital parameters as shown in FIGS. 3B and 3C or FIGS. 7B and 7C are inputted. Then the operation controller 24 calculates position information and time information for moving each vehicle 21a to 21c, and outputs them to each vehicle control unit 25a to 27a. The vehicle control units 25a to 27a generate vehicle drive control signals on the speed, direction and traveling time for moving the individual vehicles according to the position and time information and output them to the vehicles 23a to 23c.

Further, the control units 25b to 27b of the antennas 21a to 21c generate and output signals for controlling the azimuth and elevation angles of the respective antennas by the orbital parameters and the output information from the operation controller 24. As a result, the vehicles 23a to 23c can be operated so that a beam accessing a satellite of a low elevation angle is not intercepted by other antennas. Although this embodiment shows an example of the fixed earth station having three antennas 21a to 21c, it is to be understood that the present invention is not limited to this.

Figure 10:
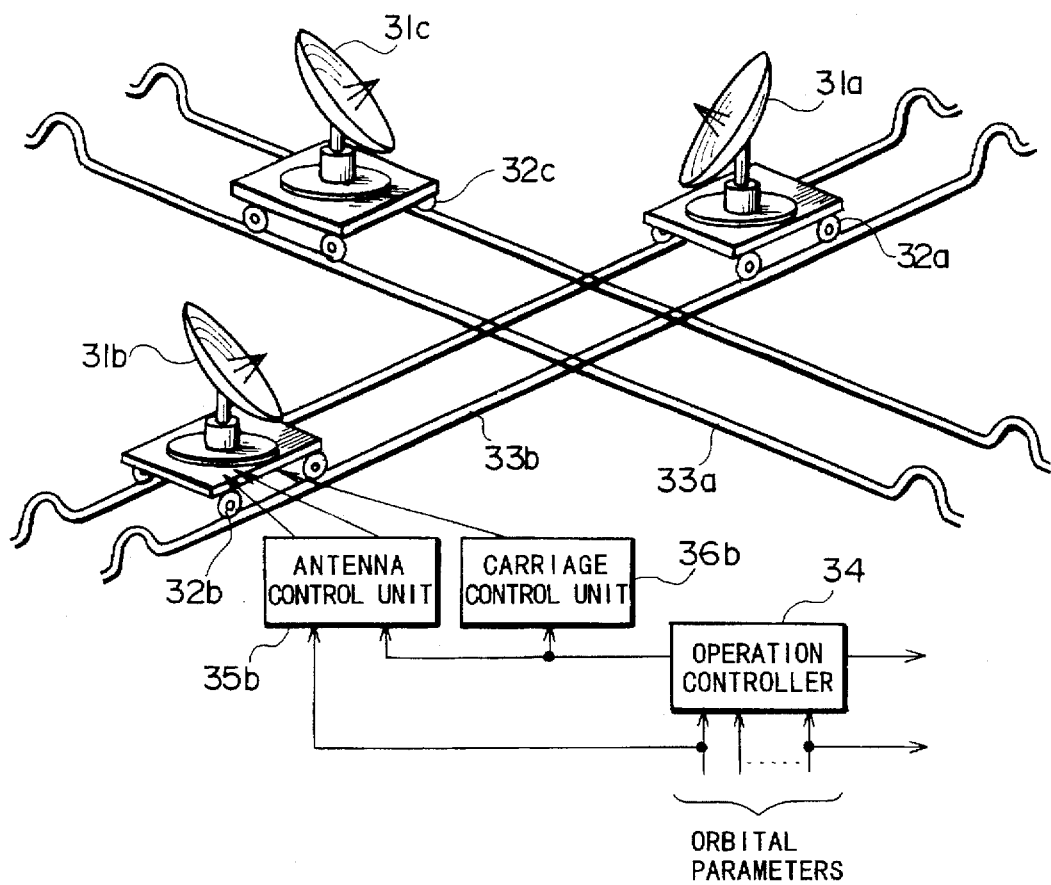
FIG. 10 is a block diagram of the fifth embodiment of the present invention.

Now, the fourth embodiment of the present invention is described with reference to FIG. 10. This embodiment shows a fixed earth station having three antennas 31a to 31c, but it is not limited to this. The three antennas are mounted on carriages 32a to 32c which can independently travel on rails 33a and 33b laid on the ground, respectively. An operation controller 34 calculates position information and time information for moving the respective carriages 32a to 32c from the orbital parameters, and outputs them to respective carriage control units 36b, . . . The carriage control units 36b, . . . calculates a schedule for movement on the rail 33a and 33b from the position information and time information. It is to be understood that measures are taken to prevent collision between the respective carriages. The respective antenna control units 35b, . . . calculate the control information for the azimuth angle and the elevation angle of the antennas on the basis of the orbital parameters of each satellite and the information from the operation controller 34, and output them to the drive units of the antennas. In accordance with this embodiment, by controlling the carriage positions and the azimuth and elevation angles of the antennas, the carriages 32a to 32c can be operated so that a beam accessing a satellite of a low elevation angle is not intercepted by other antennas.

The fifth embodiment of the present invention is now described with reference to FIG. 11. This embodiment shows a fixed earth station having four antennas 41a to 41d, but it is not limited to this. The antennas 41a to 41d are mounted on carriages 42a to 42d which can independently travel on rails 43 laid on the ground, respectively. The rails 43 include rails radially extending in at least one or more directions (in the figure, six directions) from a certain point as the center, and a turntable 44 which allows the carriages bearing the respective antennas to mutually move between these rails at the center. Accordingly, even for the movement of a non-geostationary satellite to be tracked, which largely moves across the sky, the operation of the carriages can be planned so that a beam accessing the satellite is not intercepted by other antennas. ( ) in the figure represent track numbers, and particularly (0) indicates the central turntable.

Figure 11A:
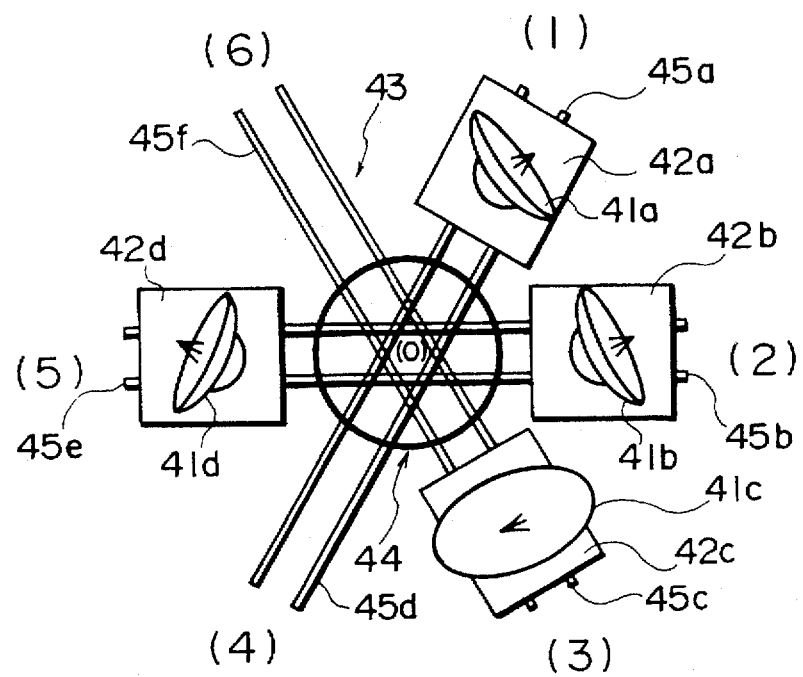
FIGS. 11A and 11B are schematic views of the sixth embodiment of the present invention.
Figure 11B:
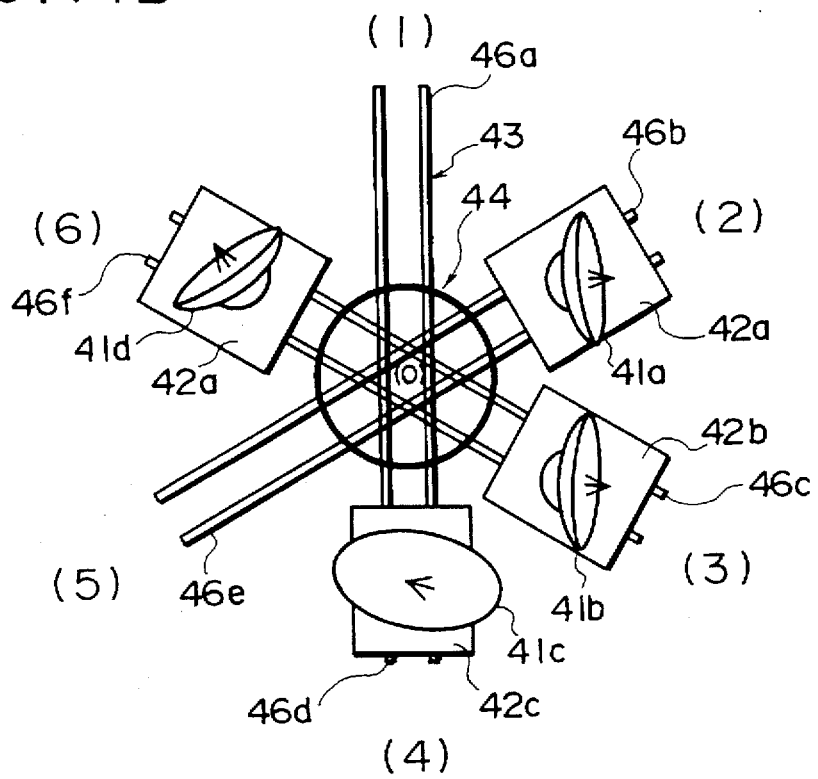
Figure 12A:
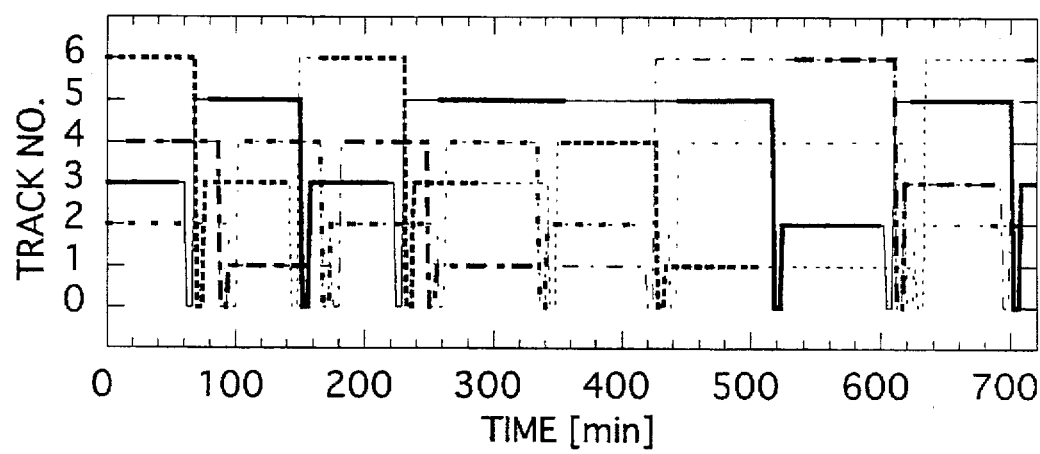
FIGS. 12A and 12B are a diagram in which the antenna positions on the base in the first example of the sixth embodiment are represented as change of track numbers 1 to 6, and a diagram showing the minimum clearance achieved by this embodiment.

FIG. 11A shows the case in which the line connecting tracks 45b and 45e is pointing east and west, and FIG. 11B shows the case in which FIG. 11A is rotated by 30 degrees so that the line connecting tracks 46a and 46d is pointing south and north. An example of the operation control for the respective antennas is now described with reference to FIGS. 12 and 13. The FIGS. 12 and 13 show numeric value examples for the medium-altitude earth orbiting satellite system comprising ten satellites, the movement of which is shown in FIG. 7 above. FIG. 12A represents the positions of the four antennas on the carriages placed on the rails of FIG. 11A as change of the track numbers 0 to 6 (track number 0 is the turntable).

The types of the lines in the graphs (solid line/dotted line/broken line/dashed line) are made to correspond to the satellites of FIG. 7, respectively.

Figure 12B:
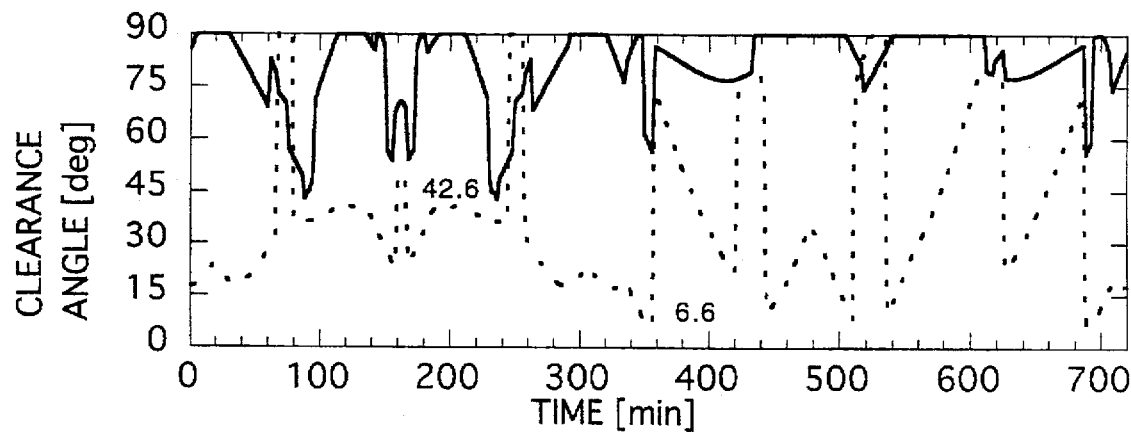

FIG. 12B shows the minimum clearance angle (solid line) obtained by the present invention, and for the purpose of comparison, also shows the minimum clearance angle (broken line) obtained when the antenna is fixed. By this embodiment, the required antenna spacing can effectively be reduced from Smin for ELmin=6.6 degrees to Smin for ELmin=42.6 degrees. Since it is considered that the effect is nearly a ratio of tan (ELmin), the length can be reduced to about ⅛ and the area can be reduced to about 1/63.

Figure 13A:
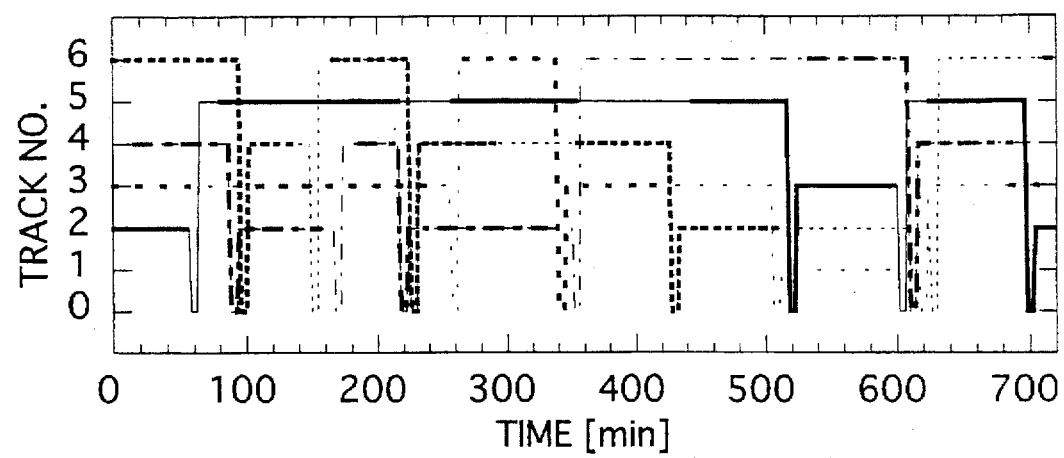
FIGS. 13A and 13B are a diagram in which the antenna positions on the base in the second example of the sixth embodiment are represented as change of the track numbers 1 to 6, and a diagram showing the minimum clearance achieved by this embodiment.
Figure 13B:
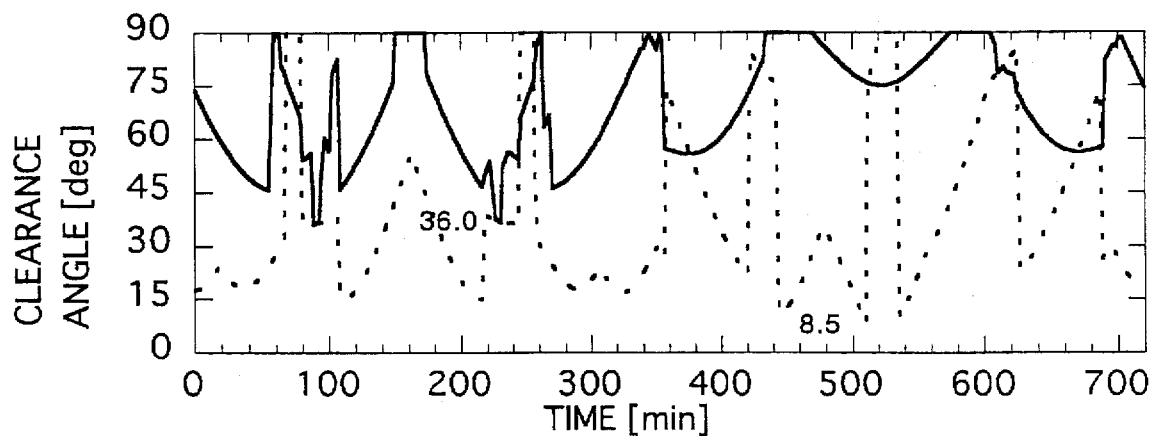

FIGS. 13A and 13B respectively show the same contents as FIGS. 12A and 12B for FIGS. 11B. In this case, the required antenna spacing can effectively be reduced from Smin for ELmin=8.5 degrees to Smin for ELmin=36 degrees. Since it is considered that the effect is nearly a ratio of tan (ELmin), the length can be reduced to about ⅕ and the area can be reduced to about 1/24.

Thus, if FIG. 11A is compared with FIG. 11 B, the former is more excellent in the point of effect. However, as apparent from a careful examination of FIGS. 12 and 13, the number of times the antennas moves between tracks through the turntable in one period of 12 hours is 18 for FIG. 11B, which is smaller than that for FIG. 11A which is 24. Further, in FIG. 11B, since an antenna in operation does not use the track (1), there is an operational advantage that the track 1 can always be kept as a bypass for maintenance (for instance, an access to a storage for repair).

Figure 14:
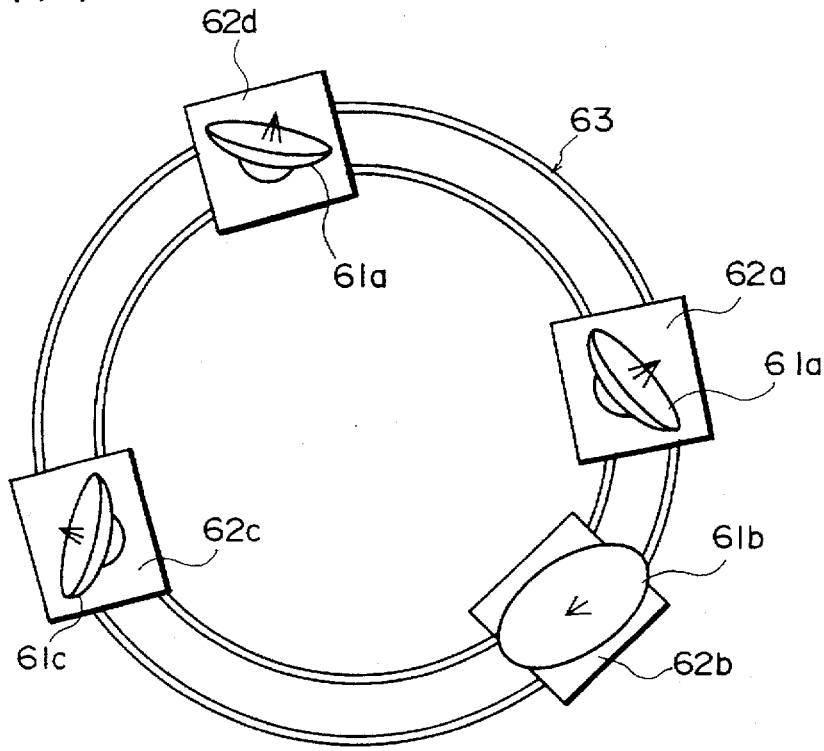
FIG. 14 is a schematic view of the seventh embodiment of the present invention.

The sixth embodiment of the present invention is described below with reference to FIG. 14. FIG. 14 shows a fixed earth station having four antennas 61a to 61d, but it does not constitute any restriction. The antennas 61a to 61d are mounted on carriages 62a to 62d which can independently travel on rails 63 laid on the ground. The rails 63 form a loop, and it is constructed so as to continuously track the periodical satellite movement.

An example of the operation control for antennas and its effect are now described. In a similar manner to the above description, numeric value examples are shown for the medium-altitude earth orbiting satellite system comprising ten satellites, the movement of which is shown in FIG. 7. FIG. 15A represents the positions of the four antennas tracking the satellites of FIG. 7 as change of the angle measured clockwise from the north with respect to the center of the loop. The types of the lines in the graph (solid line/dotted line/broken line/dashed line) are respectively made to correspond to the satellites of FIG. 7. Further, the thin line corresponds to the case in which the antennas are fixed at reference positions. FIG. 15B shows the comparison between the minimum clearance angle by this embodiment and the minimum clearance angle (broken line) for the fixed antennas.

In accordance with this embodiment, the required antenna spacing can effectively be reduced from Smin for ELmin=11 degrees to Smin for ELmin=39 degrees. Since it is considered that the effect is nearly a ratio of tan (ELmin), the length can be reduced to about ¼ and the area can be reduced to about 1/17.

Figure 16:
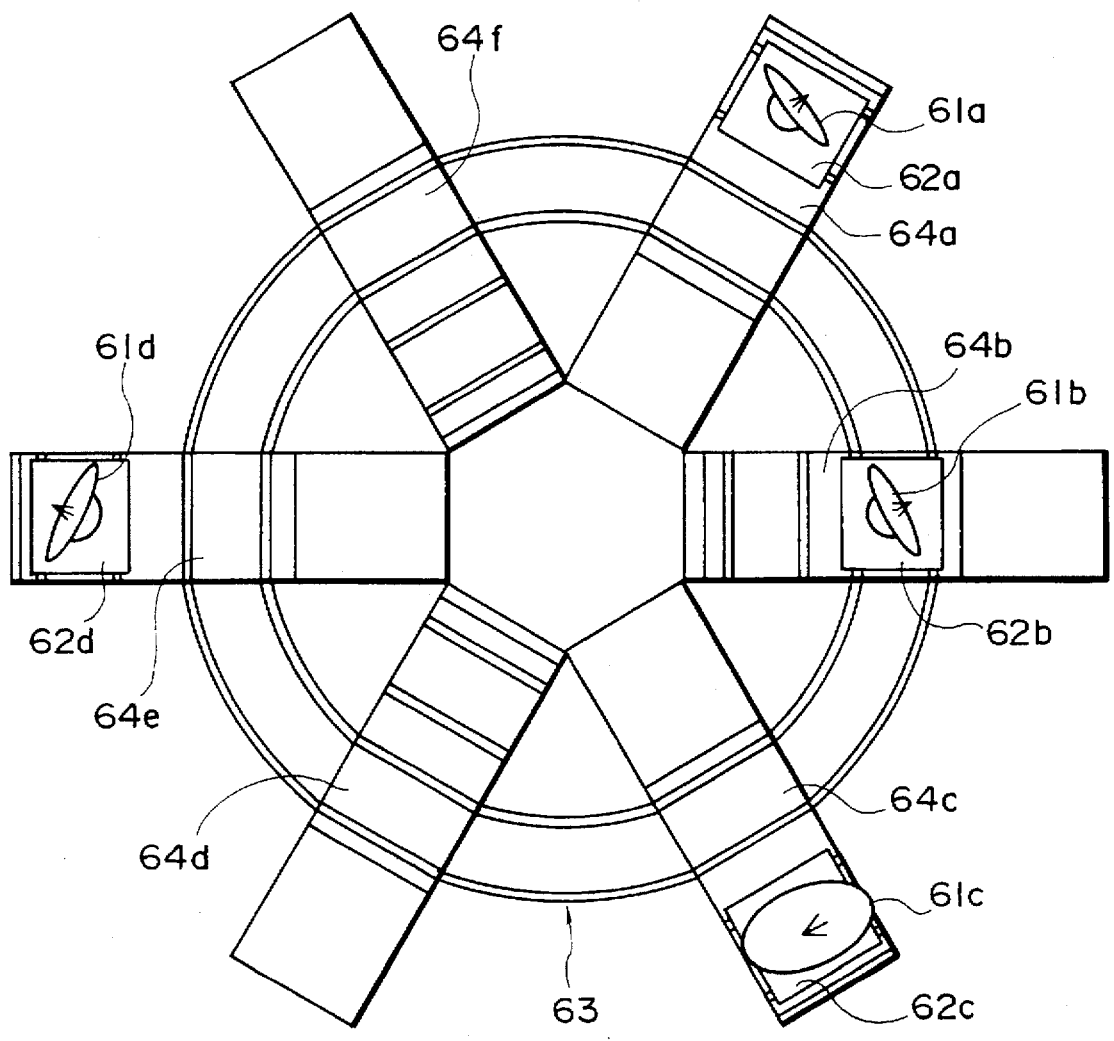
FIG. 16 is a schematic view of the eighth embodiment of the present invention.

As a variation of this embodiment, a construction can be provided in which, as shown in FIG. 16, slide mechanisms 64a to 64f is provided for allowing the carriages to depart from the rails forming the loop at six positions. This may allow a flexible operation plan in which, for the loop-shaped rails 63, the carriage bearing one antenna passes by another carriage bearing another antenna. Thus, it is effective in a system having more satellites.

In addition, the above embodiments employ a method in which each antenna tracks a satellite according to the azimuth and elevation angle control signals from the antenna control unit from a time when the satellites appears in the sky to a time when it sets, but the present invention is not limited to this, and it is also possible that the satellite is caught by the azimuth and elevation angle control signals from the antenna control unit only when the satellite appears in the sky, and after that, the satellite is caught by an automatic tracking system, not shown, until the satellite sets.

Figure 17:
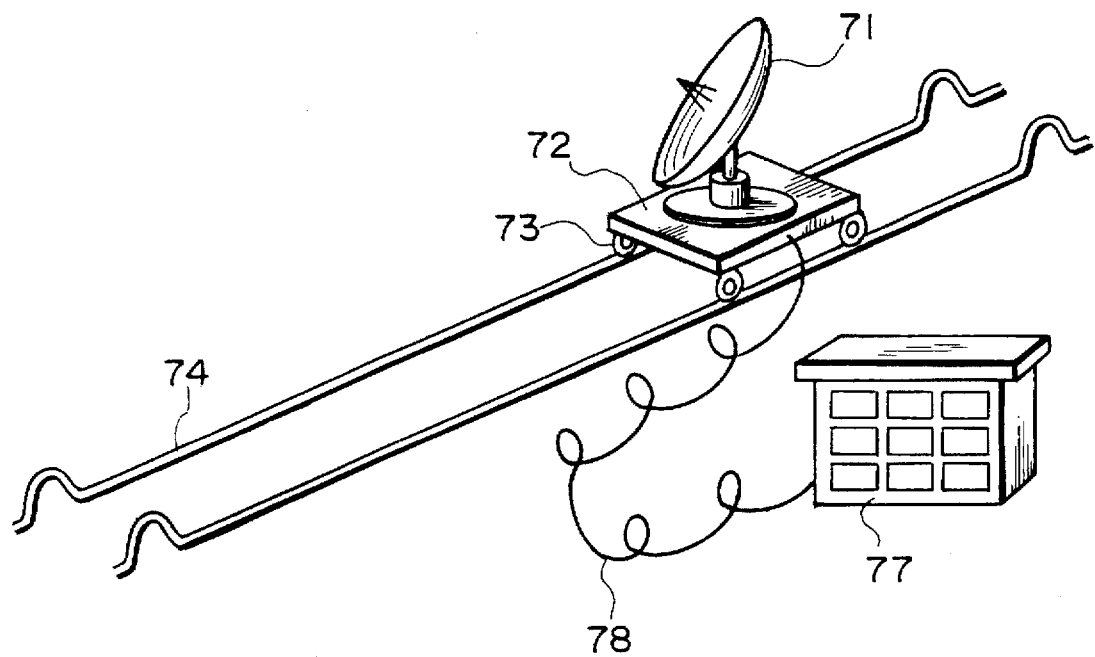
FIG. 17 is a schematic view of the ninth embodiment of the present invention.

The eighth embodiment of the present invention is described below with reference to FIG. 17. This embodiment is directed to a method for connection in the communication between an antenna variable in the position thereof and another communication facility fixedly placed on the ground.

An antenna 71 fixed to a base 72 is mounted on a carriage 73, and the carriage travels on rails 74 laid on the ground. 77 is another communication facility fixedly set on the ground, and the antenna 71 and the communication facility are interconnected by a flexible optical fiber 78. In accordance with this embodiment, a large capacity of traffic can be acquired without preventing the movement of the antenna 71. Further, since there is no electromagnetic coupling between fiber cables for other antennas, high quality can be provided. In addition, although the optical fiber cable 78 is diagrammatically shown in the figure, this may be buried in a channel or a means for adding a take-up equipment can be applied for the protection of the cable or the like.

Figure 18:
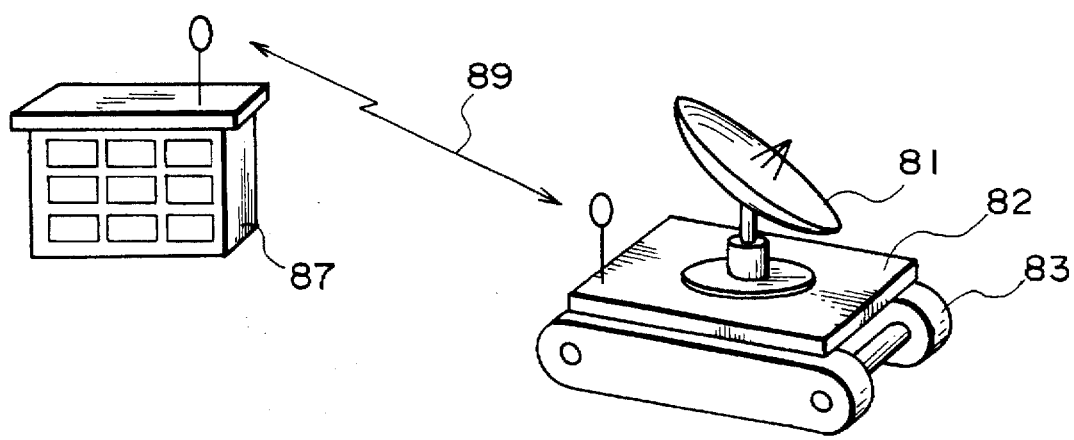
FIG. 18 is a figure showing a variation of the ninth embodiment.

FIG. 18 shows another connection method. This method shows a connection by radio transmission 89 from an antenna 81 mounted on a mobile vehicle 83 to another communication facility 87 fixedly set on the ground. A frequency band of a short wavelength such as millimeter wave (or optical region) is applicable to the radio communication section between another communication facility fixedly set on the ground and an antenna, because the distance is short and the limitation on the attenuation loss due to rainfall or the like. Accordingly, a wide band can be acquired, and the antenna and wireless installation for the radio communication section can be downsized.

Figure 19:
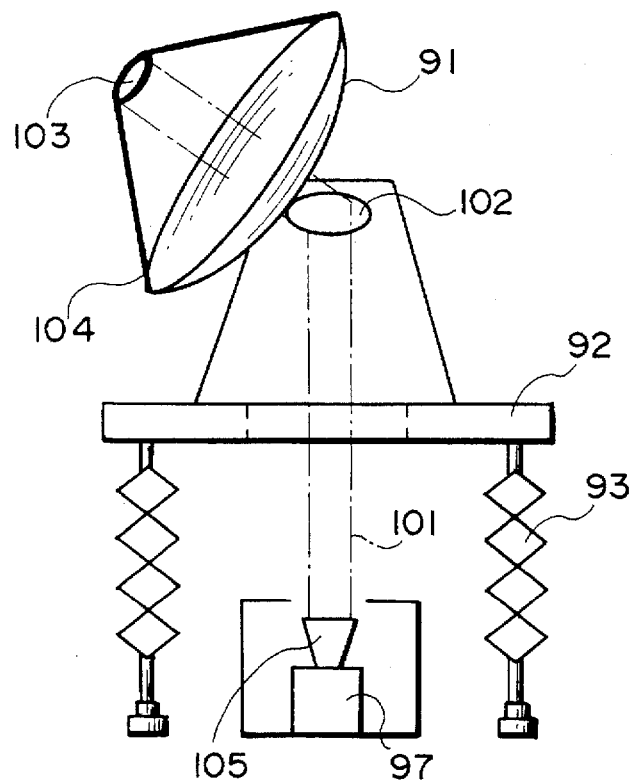
FIG. 19 is a figure showing another variation of the ninth embodiment.
Figure 20:
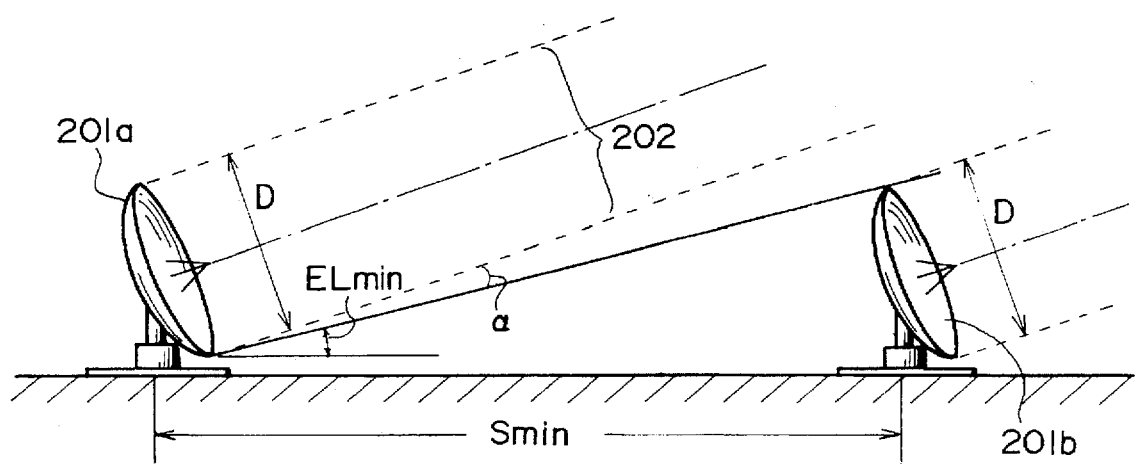
FIG. 20 is an explanatory view of the arrangement of antennas in the conventional fixed earth station.

FIG. 19 shows a further connection method. This method shows a connection which is made by a spatial beam transmission 101 from an antenna 91 mounted on a base 92 variable in the vertical position thereof to another communication facility 97 fixedly set on the ground. In this case, by a beam transmission system including a reflecting mirror (or a lens) 102, an RF signal can directly be transmitted to or received from a communication facility (transmitter-receiver) 97 fixedly set on the ground without preventing the movement of the antenna.

In the figure, a radio wave caused to reach the rear side of a main reflecting mirror 104 by a sub-reflecting mirror 103 is further reflected by a beam feeding reflecting mirror, and the beam is converged to a primary radiator 105 connected to the transmitter-receiver 97 through the electrical gap (hole) of the antenna base 92.

As apparent from the above description, in accordance with the present invention, the operation of the moving mechanism can be controlled based on the orbital parameters of a plurality of communication satellites to control the mutual placement positions of antennas so that a beam accessing a satellite of a low elevation angle is not intercepted by other antennas, and thus there is an advantage that a multiple number of antennas constituting a fixed earth station can be installed in a limited site area.

Further, since the present invention need not use a variable phase shifter for accurately controlling the phase over a wide frequency band width, nor a multi-element antenna, as in the phase array antenna, it has an advantage that it can be constructed at relatively low cost and thus it is practical.

What is claimed is:

1. A fixed earth station having a plurality of antennas the beam direction of which can be independently changed to allow simultaneous communication with a plurality of non-geostationary communication satellites existing in different directions within the visible range, said fixed earth station comprising:

a mobile mechanism for mounting part or all of said plurality of antennas;

a control unit for generating a signal for controlling the operation of said mobile mechanism, on the basis of the orbital parameters of said plurality of communication satellites, so that a beam accessing a satellite of a low elevation angle is not intercepted by other antennas; and antenna control units for controlling the direction of the antennas based at least on the orbital parameters of said communication satellites, wherein said antennas catch and track a communication satellite having appeared in the sky.

2. A fixed earth station of claim 1 wherein said plurality of antennas have an automatic tracking equipment, said antenna control units catch a non-geostationary communication satellite having appeared in the sky, and thereafter said automatic tracking equipment tracks said communication satellite.

3. A fixed earth station of claim 1 wherein said mobile mechanism is a rotary base, said plurality of antennas are mounted on said rotary base, and said base is controlled in its rotation by the control signal outputted from said control unit.

4. A fixed earth station of claim 2 wherein said mobile mechanism is a rotary base, said plurality of antennas are mounted on said rotary base, and said base is controlled in its rotation by the control signal outputted from said control unit.

5. A fixed earth station of claim 1 wherein said mobile mechanism is a mechanism which can move in the vertical direction to change its height from the ground, and at least one of said plurality of antennas is mounted on said mechanism which moves in the vertical direction to change its height from the ground, said mechanism being controlled in the height thereof by the a control signal outputted from said control unit.

6. A fixed earth station of claim 2 wherein said mobile mechanism is a mechanism which can move in the vertical direction to change its height from the ground, and at least one of said plurality of antennas is mounted on said mechanism which moves in the vertical direction to change its height from the ground, said mechanism being controlled in the height thereof by the control signal outputted from said control unit.

7. A fixed earth station of claim 1 wherein said mobile mechanism is a vehicle which can travel on the ground by itself, and at least one of said plurality of antennas is mounted on said vehicle, the position of which is controlled by the control signal outputted from said control unit.

8. A fixed earth station of claim 2 wherein said mobile mechanism is a vehicle which can travel on the ground by itself, and at least one of said plurality of antennas is mounted on said vehicle, the position of which is controlled by the control signal outputted from said control unit.

9. A fixed earth station of claim 1 wherein said mobile mechanism is mechanism which can travel on rails laid on the ground , and at least one of said plurality of antennas is mounted on said mechanism, the position of which is controlled by the control signal outputted from said control unit.

10. A fixed earth station of claim 2 wherein said mobile mechanism is mechanism which can travel on rails laid on the ground, and at least one of said plurality of antennas is mounted on said mechanism, the position of which is controlled by the control signal outputted from said control unit.

11. A fixed earth station of claim 9 wherein at least one of said plurality of antennas is mounted on a mechanism which can travel on radial rails laid on the ground and travel on a turntable connecting the rails.

12. A fixed earth station of claim 9 wherein at least one of said antennas is mounted on a mechanism which can travel on rails laid on the ground and including the shape of a loop.

13. A fixed earth station of claim 1 wherein at least part of the fixed earth station comprises a communication facility fixedly placed on the ground, and at least a partial section of the communication signal path between said plurality of antennas and said fixedly placed communication facility is implemented by optical fibers.

14. A fixed earth station of claim 1 wherein at least a partial section of the communication signal path between said plurality of antennas and a fixedly placed communication facility forming part of the fixed earth station is implemented by a wireless transmission path.

15. A fixed earth station of claim 1 wherein at least one of said plurality of antennas is a reflecting mirror antenna, a primary radiator for feeding said reflecting mirror is fixedly placed on the ground, and said primary radiator and said reflecting mirror are connected by a beam transmission system.

* * * * *